(12) United States Patent
Kitajima et al.

(10) Patent No.: US 6,314,346 B1
(45) Date of Patent: *Nov. 6, 2001

(54) CONTROL SYSTEM FOR HYBRID VEHICLE

(75) Inventors: Shinichi Kitajima; Atsushi Izumiura; Keisuke Uchida; Katsuhiro Kumagai; Asao Ukai; Hironao Fukuchi, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/453,543

(22) Filed: Dec. 3, 1999

(30) Foreign Application Priority Data

Dec. 7, 1998 (JP) .................................................. 10-347543

(51) Int. Cl.$^7$ .............................. B60L 11/00; H02J 7/00; B60K 1/00
(52) U.S. Cl. ........................... 701/22; 320/104; 320/132; 180/65.1; 180/65.2; 180/65.3
(58) Field of Search .............................. 701/22; 320/103, 320/104, 121, 123, 132; 180/65.1, 65.2, 65.3; 290/7, 16, 50

(56) References Cited

U.S. PATENT DOCUMENTS 5,786,640 * 7/1998 Sakai et al. .............................. 290/17
5,910,722 * 6/1999 Lyons et al. ........................... 320/104
6,166,517 * 12/2000 Wakashiro et al. ................... 320/104

* cited by examiner

Primary Examiner—Yonel Beaulieu
(74) Attorney, Agent, or Firm—Armstrong,Westerman, Hattori, McLeland & Naughton, LLP

(57) ABSTRACT

A control system for a hybrid vehicle with an engine for producing a driving force for the vehicle, a motor for producing an assist driving force to assist the output from the engine, and a power storage unit for supplying electric energy to the motor and storing regenerated energy produced by regeneration of the motor when the vehicle decelerates. The control system includes a charge zone determining device for determining whether a state of charge (SOC) is within the normal use range, temporary use range, overdischarge range, or over-charge range; a generation mode selector for selecting one of a normal generation mode corresponding to normal use zone, a low generation mode corresponding to temporary use zone, a high generation mode corresponding to over-discharge zone, and a generation stop mode corresponding to over-charge zone, based on the determination by the charge zone determining device; and a generation amount setter for setting the amount of electric power generation corresponding to each mode.

5 Claims, 11 Drawing Sheets

CONTROL SYSTEM FOR HYBRID VEHICLE

BACKGROUND OF THE INVENTION

1. Field of the Invention

This invention relates to a control system for a hybrid vehicle with an engine and a motor, and in particular, to a control system for a hybrid vehicle which appropriately charges a battery even when the vehicle is cruising and the engine is not assisted by the motor.

This application is based on Japanese Patent Application No. Hei 10-347543, the contents of which are incorporated herein by reference.

2. Description of the Related Art

Conventionally, hybrid vehicles which carry motors as power sources for driving the vehicles in addition to engines are known. Hybrid vehicles are divided into series hybrid vehicles and parallel hybrid vehicles. In series hybrid vehicles, the engine drives a generator, which outputs electric power to the motor, and the motor drives the wheels.

Because the engine and the wheels are not mechanically connected, the engine constantly runs within a rotational range which reduces fuel consumption and emissions, as compared with conventional engine vehicles.

In parallel hybrid vehicles, the motor connected to the engine assists the rotation of the drive shaft of the engine while charging a battery using a generator which is separate from the motor or is the motor itself.

Although the engine and the wheels are mechanically connected, the parallel hybrid vehicle can reduce the load to the engine. Thus, the parallel hybrid vehicle also has reduced fuel consumption and emissions as compared with conventional engine vehicles.

In the parallel hybrid vehicle, the motor for assisting the output of the engine is directly connected to the output shaft of the engine, and acts as a generator for charging the battery when the vehicle speed is reduced. Alternatively, either or both of the engine and the motor may generate the drive power, and the generator may be provided separately.

When a hybrid vehicle accelerates, the engine is assisted by the motor, and, when it decelerates, various operations are performed, such as charging the battery by deceleration regeneration, so as to maintain sufficient electric energy in the battery (hereinafter referred to as the "state of charge (remaining charge)") to meet the driver's demands. Specifically, because high deceleration regeneration is obtained after high speed cruising, the battery regains a part of the consumed energy when decelerating. After the vehicle goes up a slope such as a mountain path, the vehicle can charge its battery by deceleration regeneration when the vehicle goes down (as disclosed in, for example, Japanese Patent Application, First Publication No. Hei 7-123509).

In the conventional hybrid vehicles, in particular, in the parallel hybrid vehicle in which the driving shaft of the engine is connected with the motor, when the vehicle is cruising while the motor does not perform torque assist for the driving shaft of the engine, the motor acts as a generator, thereby increasing the remaining charge of the battery.

The remaining charge, however, is not always increased when the vehicle is running. The remaining charge mainly depends on the past running condition. The amount of electric power generation should be adjusted appropriately in consideration of the remaining charge.

When the remaining charge is decreasing depending on the running condition and on the road condition, the amount of electric power generation must be adjusted so as to stop the decrease of the remaining charge.

SUMMARY OF THE INVENTION

It is therefore an object of the present invention to provide a control system for a hybrid vehicle which adjusts the amount of electric power generation, taking in consideration the remaining charge of the battery, when the vehicle is cruising.

In a first aspect of the present invention, the control system is provided for a hybrid vehicle with an engine (E) for producing a driving force for the vehicle, a motor (M) for producing an assist driving force to assist the output from the engine, and a power storage unit (battery 3) for supplying electric energy to the motor and storing regenerated energy produced by regeneration of the motor when the vehicle decelerates. The control system comprises: a charge zone determining device (steps S402, S405, and S409) for determining whether the state of charge (SOC) is within normal use range (zone A), temporary use range (zone B), over-discharge range (zone C), or over-charge range (zone D); a generation mode selector (steps S403, S406, S410, and S411) for selecting one of a normal generation mode (step S410) corresponding to the normal use zone, a low generation mode (step S411) corresponding to the temporary use zone, a high generation mode (step S406) corresponding to the over-discharge zone, and a generation stop mode (step S403) corresponding to the over-charge zone, based on the determination by the charge zone determining device; and a generation amount setter (step S414) for setting the amount of electric power generation corresponding to each mode.

First, the charge zone determining device determines the remaining charge of the power storage unit. Then, the generation mode setter selects the mode. That is, when in the over-charge zone, the generation stop mode is selected. When in the over-discharge zone, the high generation mode is selected. When in the temporary use zone, the low generation mode is selected. When in the normal use zone, the normal generation mode is selected. The amount of electric power generation is set depending on the generation stop mode, the high generation mode, the low generation mode, and the normal generation mode by the generation amount setter.

The present invention can appropriately control the SOC, taking into consideration the remaining charge, because the generation amount setter sets the amount of generation, depending on the generation mode determined by the charge zone determining device.

In a second aspect of the present invention, the system further comprises: a DOD limit determining device (step S407) for determining whether the vehicle is in a depth-of-discharge limit control mode, in which the power storage unit is charged to recover the initial state of charge (SOCINT in step S101), which was detected at the starting of the vehicle, when the remaining charge is decreased from the initial state of charge by a predetermined amount (DODLMT in step S102). When the DOD limit determining device determines that the vehicle is in the depth-of-discharge limit control mode, the generation mode selector selects a DOD limit generation mode (step S408), and the generation amount setter sets the amount of generation corresponding to the DOD limit generation mode.

When DOD limit determining device determines that the vehicle is in the depth-of-discharge limit control mode, the generation mode selector selects the DOD limit generation mode, and the generation amount setter appropriately sets the amount of electric power generation corresponding to the depth-of-discharge limit control mode when the vehicle is cruising.

In the depth-of-discharge limit control mode, the generation is increased (step S408 of initiating the DOD limit generation mode when in the cruise mode), the frequency of charging the power storage unit is increased (step S245 of increasing the value for the throttle assist trigger), and the assist amount is decreased (step S318 of decreasing the assist amount when in the acceleration mode).

In a third aspect of the present invention, the electric power generation set by generation amount setter has the relationship of: the electric power generated in the high generation mode>the electric power generated in the low generation mode≧the electric power generated in the DOD limit generation mode>the electric power generated in the normal generation mode>the electric power generated in the generation stop mode=0.

As the remaining charge of the power storage unit decreases, the generation is increased. When the power storage unit is over-charged, the generation is stopped. More electric power is generated in the DOD limit generation mode than in the normal generation mode, thereby quickly increasing the remaining charge.

In a fourth aspect of the present invention, the system further comprises a lean-burn mode determining device (step S412) for determining whether the vehicle is in the lean-burn mode in which the engine is driven at an air fuel ratio greater than the theoretical air-fuel ratio. When the lean-burn mode determining device determines that the vehicle in the lean-burn mode, the amount of electric power generation set by the generation amount setter is decreased (step S413).

Because, when the lean-burn mode determining device determines that the vehicle is in the lean-burn mode, the amount of electric power generation is decreased, the load on the engine is reduced, thereby preventing the change from the lean-burn zone to the stoichiometric zone.

In a fifth aspect of the present invention, when the charge zone determining device determines that the power storage unit is in the over-discharge zone, the entry into the lean-burn mode is prohibited.

When the power storage unit is over-discharged, the vehicle enters the lean-burn mode and this process prevents a shortage of electric power generation.

DETAILED DESCRIPTION OF THE PREFERRED EMBODIMENTS

The present invention will be explained with reference to the figures.

Figure 1:
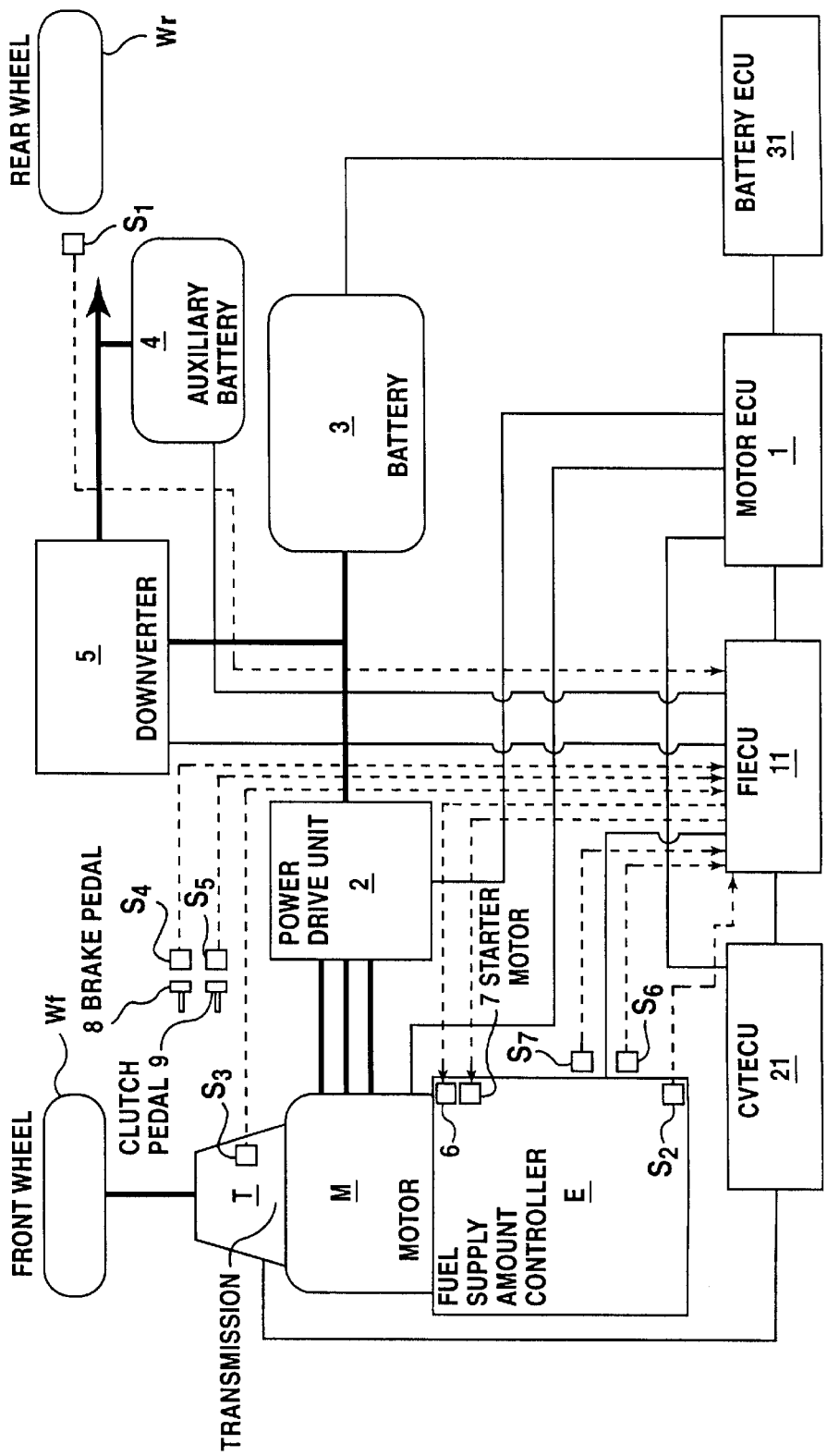
FIG. 1 is a schematic diagram showing the overall structure of the hybrid vehicle of the present invention.

FIG. 1 shows the embodiment applied to a parallel hybrid vehicle. Driving forces from an engine E and a motor M are transmitted via a transmission T, such as an automatic transmission or a manual transmission, to front wheels Wf which are the drive wheels. When the hybrid vehicle decelerates and the driving force is transmitted from the front wheels Wf to the motor M, the motor M acts as a generator to generate regenerative braking force, so that the kinetic energy of the vehicle body is stored as electric energy.

The driving and regeneration by the motor M are performed by a power drive unit 2 according to control commands from a motor ECU 1. A high voltage battery 3 for sending and receiving electric energy to and from the motor M is connected to the power drive unit 2. The battery 3 includes a number of modules connected in series, and in each module a number of cells are connected in series. The hybrid vehicle includes a 12 volt auxiliary battery 4 for driving various accessories. The auxiliary battery 4 is connected to the battery 3 via a downverter 5. The downverter 5, controlled by an FIECU 11, reduces the voltage from the battery 3 and charges the auxiliary battery 4.

The FIECU 11 controls, in addition to the motor ECU 1 and the downverter 5, a fuel supply amount controller 6 for controlling the amount of fuel supplied to the engine E, a starter motor 7, an ignition timing, etc. Therefore, the FIECU 11 receives a signal from a speed sensor $S_1$ for detecting the vehicle speed V based on the rotation of the rear wheels Wr as follower wheels, a signal from an engine rotational speed sensor $S_2$ for detecting the engine rotational speed NE, a signal from a shift position sensor $S_3$ for detecting the shift position of the transmission T, a signal from a brake switch $S_4$ for detecting operation of a brake pedal 8, a signal from a clutch switch $S_5$ for detecting operation of a clutch pedal 9, a signal from a throttle valve opening sensor $S_6$ for detecting the throttle opening state TH, and a signal from an air intake passage pressure sensor $S_7$ for detecting the air intake passage pressure PB. In FIG. 1, reference numeral 21 denotes a CVTECU for controlling a CVT, and reference numeral 31 denotes a battery ECU for protecting the battery 3 and calculating the state of charge (remaining charge) SOC of the battery 3.

The control modes of the hybrid vehicle are "idle mode", "deceleration mode", "acceleration mode", and "cruise mode."

Determination of Motor Operation Mode

Referring to the flowchart of FIG. 2, the process for determining a motor operation mode will be explained.

In step S1 in the flowchart of FIG. 2, a depth-of-discharge limit determination, which is described later, is made, and in step S2 an assist trigger determination, which is also described later, is made. Then, in step S3 it is determined whether the throttle is completely closed based on a throttle-completely-closed-state determination flag F_THIDLMG.

When in step S3 the throttle-completely-closed-state flag F_THIDLMG is 0, that is, when the throttle valve is completely closed, and when in step S4 the vehicle speed V detected by the vehicle speed sensor $S_1$ is 0, that is, when the vehicle is stopped, the idle mode is selected in step S5, so that the supply of the fuel is restarted after the fuel cut, and the engine E is maintained in an idling state.

When in step S3 the throttle-closing-state flag F_THIDLMG is 0, that is, when the throttle valve is completely closed, and when in step S4 the vehicle speed V detected by the vehicle speed sensor $S_1$ is not 0, the deceleration mode is selected in step S6, and then regenerative braking by the motor M is carried out.

When in step S3 the throttle-closing-state flag F_THIDLMG is 1, that is, when the throttle valve is opened, the flow proceeds to step S7. Then, the motor assist determination flag F_MAST is read to select the acceleration mode or the cruise mode.

When in step S7 the motor assist determination flag F_MAST is 1, the acceleration mode is selected in step S8, and the motor M assists the engine E. When in step S7 the motor assist determination flag F_MAST is 0, the cruise mode is selected in step S9, the motor M is not driven, and the vehicle runs only by the driving force from the engine E. In step S10, the output from the motor is provided correspondingly to each mode.

Zoning of State of Charge (SOC)

The zoning of the state of charge (also referred to as the "remaining charge" or SOC) (dividing the remaining charge into zones) will be explained. The calculation of the SOC is carried out by the battery ECU 31, based on, i.e., the voltage, the discharged current, or the temperature.

In this example, zone A (from 40% to 80 or 90% of SOC), which is the normal use zone, is defined as the standard. Zone B (from 20% to 40% of SOC), which is a temporary use zone, is below zone A, and zone C (from 0% to 20% of SOC), which is an over-discharge zone, is below zone B. Zone D (from 80% or 90% to 100% of SOC), which is an overcharge zone, is above zone A.

The SOC is calculated based on discharged current values when in zones A and B, and is calculated based on voltages when in zones C and D, taking into consideration the characteristics of the battery.

The boundaries between zones have upper and lower threshold values. The threshold values when the SOC is increasing are chosen to differ from those when the SOC is decreasing so as to cause hysteresis.

When the SOC cannot be calculated because the battery 3 is exchanged and the SOC in the battery ECU 31 is reset, the initial SOC is assumed to be 20% which is at the boundary between zones C and D. To increase this assumed value by a predetermined amount (for example, approximately 20%), the vehicle mainly charges the battery as much as possible. Thus, when initially the actual SOC was in zone B, the SOC enters zone A. When initially the actual SOC was in zone A, the SOC remains in zone A, and, before the SOC enters zone D, the charging of the battery is stopped based on the present voltage. Then, the present SOC is detected.

The assist, deceleration regeneration, idling, cruise, starting, initial SOC, and determination of whether the assist is started (hereinafter referred to as "assist determination") in each zone (including a situation in which the SOC cannot be detected) will be explained below.

In zone A, the motor M performs torque assist and deceleration regeneration. Further, the motor M charges the battery when the vehicle is cruising. The starting is performed by the motor M driven by the high voltage battery 3. When in the partial zone of the engine rotational speed NE (in a zone in which a partial load is caused on the engine E), the assist determination is made based on an air intake passage pressure PB which is proportional to the engine torque. When in the full-throttle zone, the assist determination is made, based on the map corresponding to a throttle opening state (e.g., a throttle opening degree, or a throttle opening amount), which represents the intention of the driver to accelerate the vehicle. Thus, in the partial zone in which the reduction of the fuel consumption is demanded, fine control is possible and the acceleration performance is improved.

Zone B differs from zone A in that the charging of the battery is increased when the vehicle is cruising. To increase the frequency of charging the battery, the value for the assist trigger may be increased. Thus, although when in zone A the motor M performs torque assist, when in zone B the motor M does not perform the assist to allow the vehicle to cruise, increasing the frequency of charging the battery.

Because in zone C the SOC is low, the motor M stops the torque assist, and the charging of the battery is greater than that in zone B. Because the high voltage motor M cannot perform the starting, the starter motor 7 performs the starting using the auxiliary 12V battery 4. Because when in zone C the motor M does not perform the torque assist, determination of whether to assist is not performed.

In zone D, because the SOC is greater than in zone A and the battery is nearly fully charged, charging and deceleration regeneration are not performed. Starting is performed by the starter motor 7. The value for the assist trigger is decreased.

Depth-of-Discharge Limit Determination

The process for determining the depth-of-discharge limit control mode in step S2 in the determination of the motor operation mode in FIG. 2 will be explained with reference to the flowchart of FIG. 3.

In step S100, it is determined whether the start switch determination flag F_STS has the value 1 or 0, i.e., whether it is a first run (whether the engine has just started). When the start switch determination flag F_STS is 1, that is, when it is the first run, the initial state of charge SOCINT is read in step S101 when the vehicle starts running.

Figure 4:
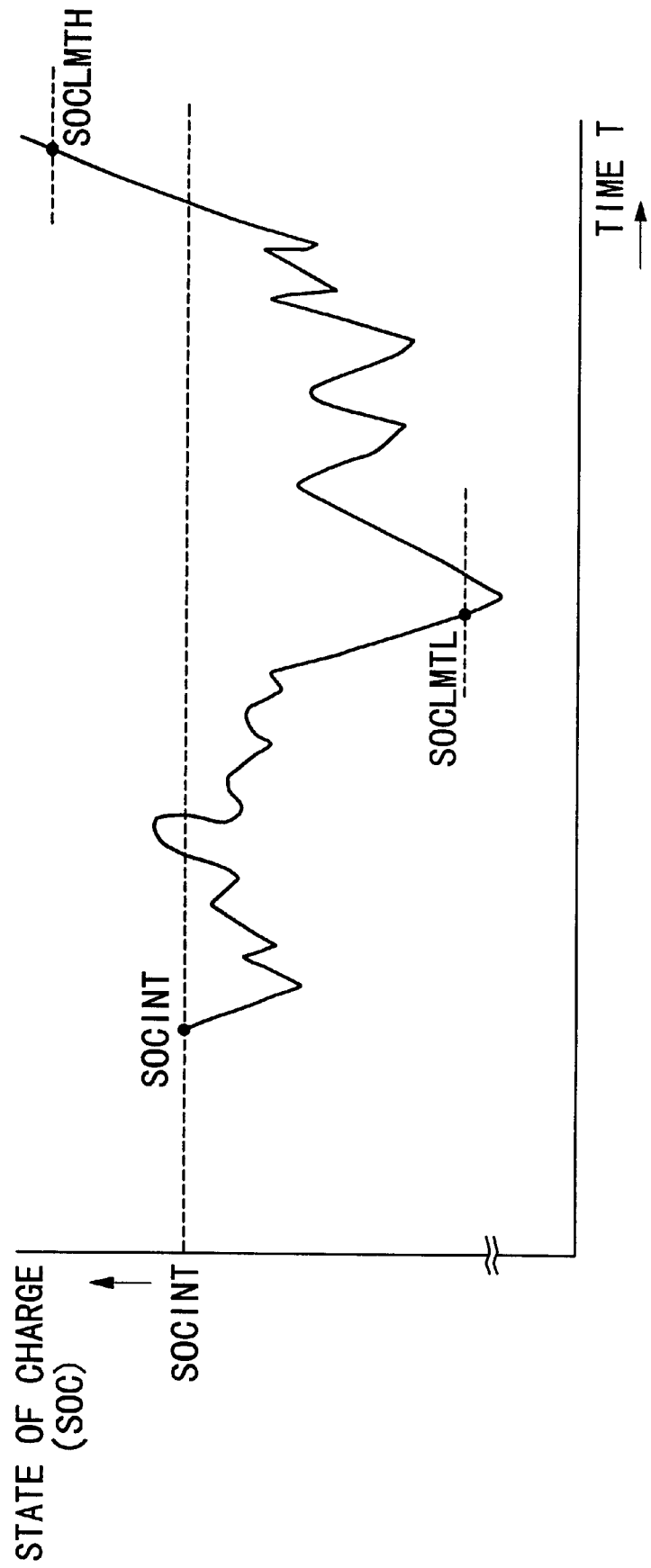
FIG. 4 is a graph showing a state of charge SOC in the depth-of-discharge limit control mode of the present invention.

Based on the present SOC which is set as the initial state, the lower threshold value SOCLMTL is set in step S102, and the upper threshold value SOCLMTH is set in step S103 (see FIG. 4). The discharge amount DODLMT for determining the lower threshold value SOCLMTL is, i.e., 3% to 4% of the SOC, taking into consideration of the individual characteristics of the battery 3. The charge amount SOCUP for determining the upper threshold value SOCLMTH is, i.e., 5% to 10% of the SOC. For example, when the initial state SOCINT is 60%, the lower threshold value SOCLMTL is 56% to 57%, and the upper threshold value SOCLMTH is 65% to 70%.

Subsequently, in step S104, the last DOD limit determination flag F_DODLMT is set to 0, and the last depth-of-discharge limit control mode is stopped.

When the vehicle starts running, the start switch determination flag F_STS is set to 0 in step S100, and in step S105 it is determined whether the SOC in the battery 3 is within zone A, based on the energy storage zone A determination flag F_ESZONEA. The determination is made because the depth-of-discharge limit control mode is selected only when the SOC is within zone A. In the other zone, the depth-of-discharge limit control mode may be selectable, depending on the capacity of the battery 3 and the performance of the motor M. For example, when the capacity of the battery 3 is large and the motor M outputs a large amount of electric energy, the mode may also cover zone B.

When in step S105 the energy storage zone A determination flag F_ESZONEA is 1, that is, when the SOC is within zone A, it is determined in step S106 whether the SOC is below the lower threshold value SOCLMTL. When in step S105 the energy storage zone A determination flag F_ESZONEA is 0, that is, when the SOC is outside zone A, the flow proceeds to step S104.

When in step S106 SOC<SOCLMTL, that is, when the SOC is below the lower threshold value SOCLMTL, the DOD limit determination flag F_DODLMT is set to 1 in step S107 so as to establish the depth-of-discharge limit control mode. Thus, in each mode, control is performed depending on the state of the flag (even when the flag is 0, the same control is performed).

When the depth-of-discharge limit control mode is selected, the electric energy is generated to increase the SOC as shown in FIG. 4. Just before the SOC shifts from zone A to zone D, the energy storage zone A determination flag F_ESZONEA becomes 0 in step S105, and the depth-of-discharge limit control mode is stopped in step S104. When SOC≧SOCLMTL, that is, when the SOC is above the lower threshold value SOCLMTL, the state of the DOD limit determination flag F_DODLMT is detected in step S108.

When in step S108 the state of the flag is 1, that is, when it is determined that the depth-of-discharge limit control mode is selected, it is determined in step S109 whether SOC>SOCLMTH, that is, whether the SOC is above the upper threshold value SOCLMTH. When in step S109 SOC>SOCLMTH, that is, when it is determined that the SOC is above the upper threshold value SOCLMTH, the depth-of-discharge limit control mode is stopped in step S104.

Figure 2:
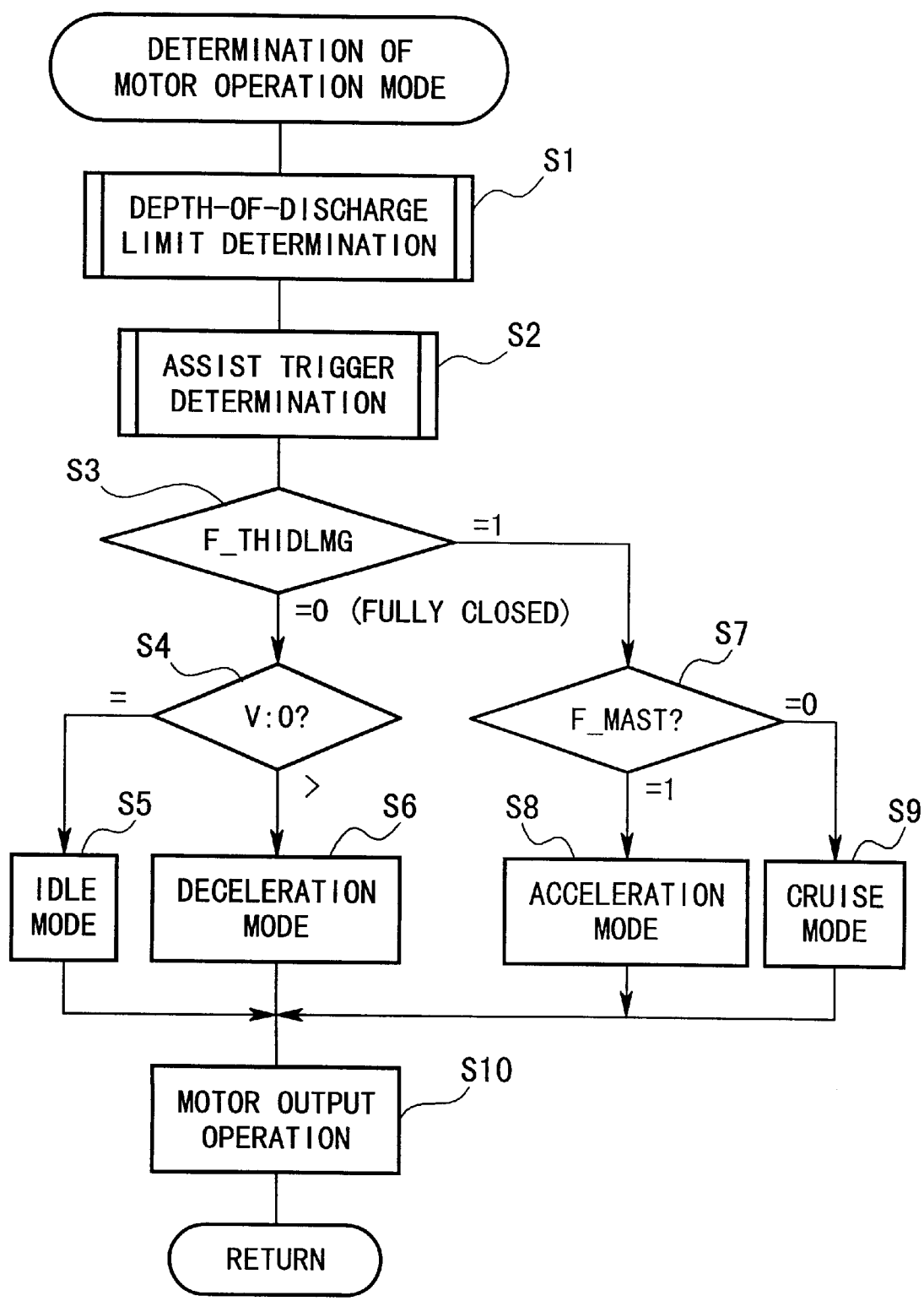
FIG. 2 is a flowchart showing a determination of the motor operation mode of the present invention.
Figure 3:
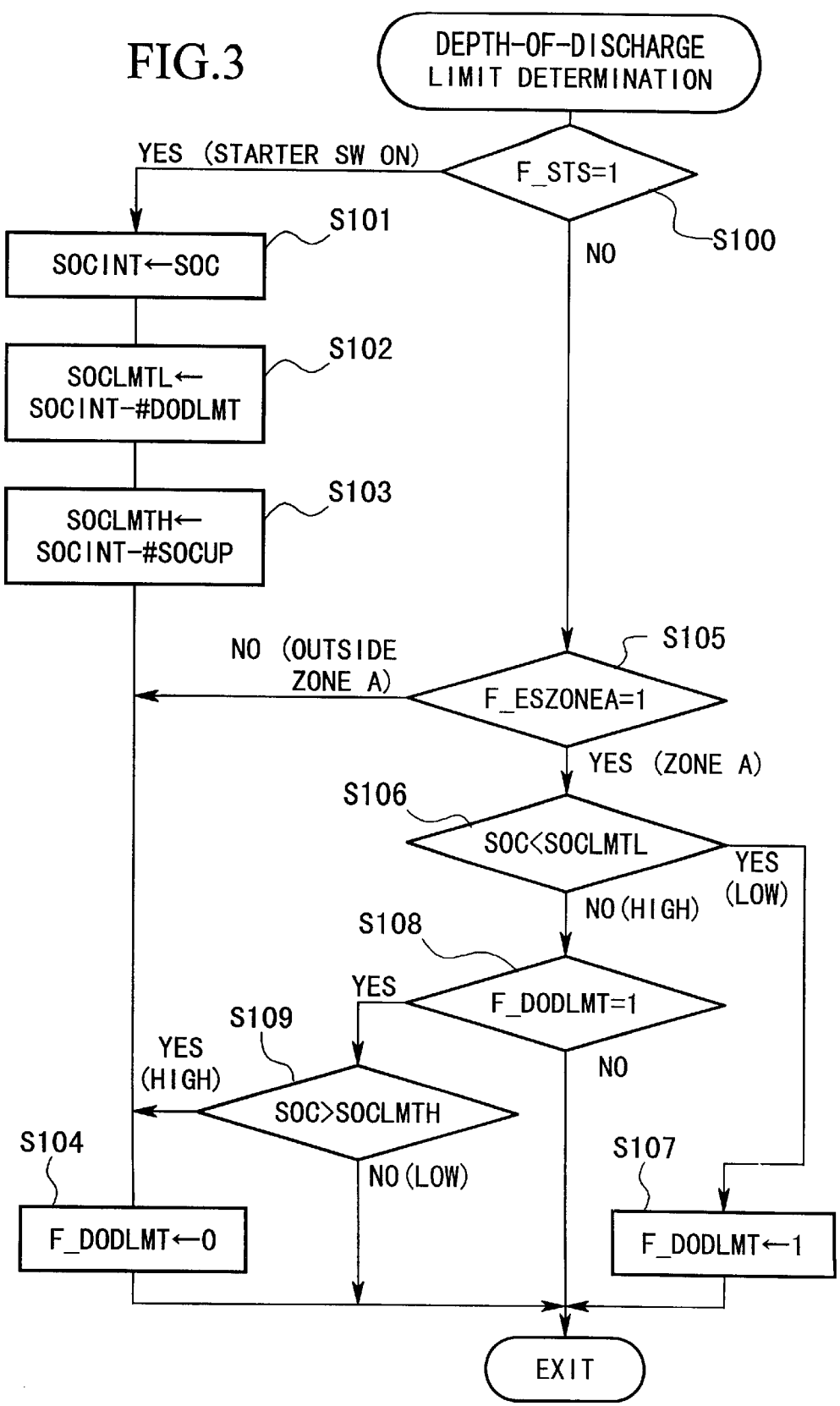
FIG. 3 is a flowchart showing the first embodiment of a depth-of-discharge limit determination of the present invention.

In addition, when in step S108 the DOD limit determination flag F_DODLMT is 0, that is, when the depth-of-discharge limit control mode is stopped, or when in step S109 SOC≦SOCLMTH, that is, when the SOC is equal to or below the upper threshold value SOCLMTH, the main routine in FIG. 2 is ended, and the process from step S100 is repeated again.

When in step S105 the SOC is outside zone A, the SOC may enter zone B for some reason. In this case also, the depth-of-discharge limit control mode is stopped in step S104.

Next, the contents of the depth-of-discharge limit control mode will be described in more detail. The depth-of-discharge limit control mode relates to "assist trigger determination" in step S2, "acceleration mode" in step S8, and "cruise mode" in step S9 in the main routine shown in FIG. 2. The contents of these steps will be explained below.

In the depth-of-discharge limit control mode which is described below in more detail, as shown in FIG. 4, the vehicle responds to the intention of the driver to accelerate the vehicle, and the vehicle responds quickly, while the SOC is increased by the SOCUP.

The assist trigger determination in step S2 in the main routine will be explained with reference to FIGS. 5 to 10. The acceleration mode in step S8 will be explained with reference to FIGS. 11 to 13. The cruise mode in step S9, which is the main part of the present invention, will be explained with reference to FIG. 14.

Assist Trigger Determination

Figure 5:
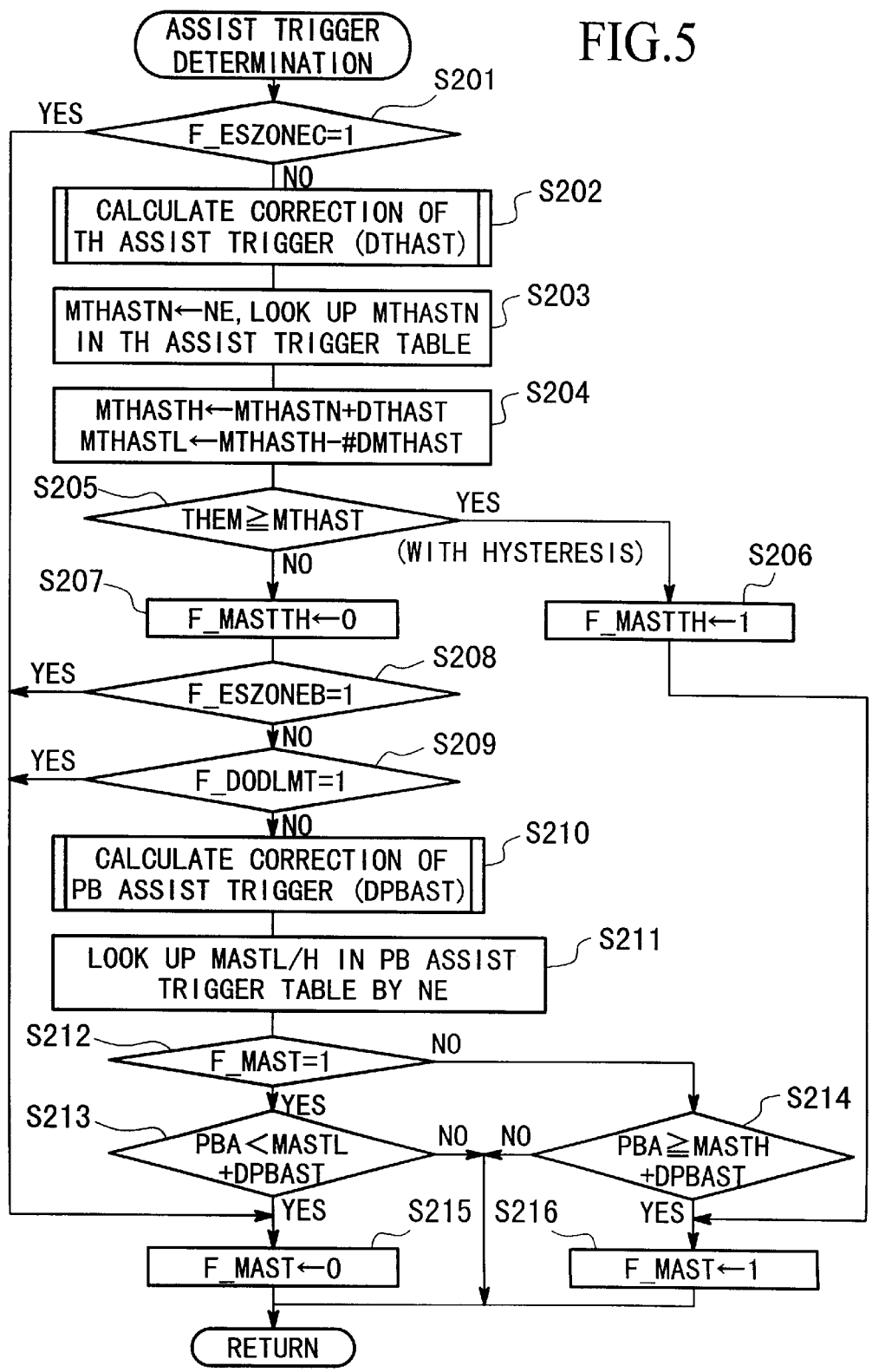
FIG. 5 is a flowchart for an assist trigger determination of the present invention.
Figure 6:
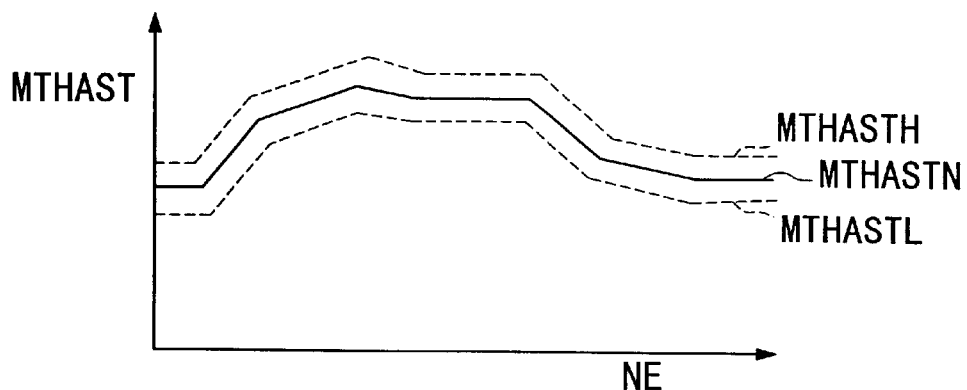
FIG. 6 is a graph showing threshold values for a TH (throttle opening state) assist mode and of a PB (air intake passage pressure) assist mode of the present invention.
Figure 7:
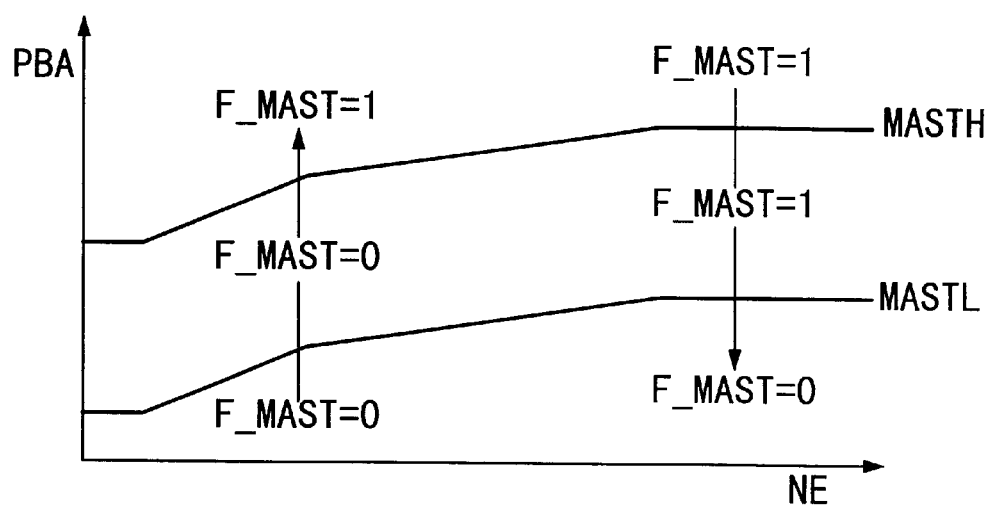
FIG. 7 is a graph showing the threshold values in the PB assist mode of the present invention.
Figure 9:
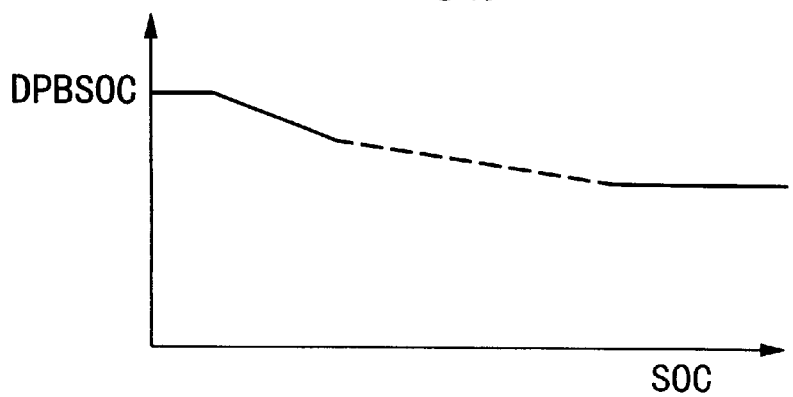
FIG. 9 is a graph showing the correction table of the PB variation of the present invention.

The process for the assist trigger will be explained with reference to the flowchart of FIG. 5.

In step S201, it is determined whether the SOC is within or outside zone C, depending on whether the energy storage zone C determination flag F_ESZONEC is set to 1 or not. The energy storage zone C determination flag F_ESZONEC is set to 1 when the SOC is within zone C, and is set to 0 when the SOC is outside zone C. When the SOC is within zone C, the flow proceeds to step S215 so as not to perform the motor assist. When the SOC is outside zone C, the flow proceeds to step S202.

In step S202, a correction value DTHAST for correcting the assist trigger based on the state of throttle is calculated. The calculation will be described later.

In step S203, a threshold value MTHASTN which is the standard for the throttle assist trigger is looked up in a throttle assist trigger table. The throttle assist trigger table, as shown with the solid line in FIG. 6, defines the threshold value MTHASTN of the throttle opening state depending on the engine rotational speed NE. The threshold value MTHASTN is the standard for the determination of whether the motor assist is performed.

Subsequently, in step S204, the correction value DTHAST calculated in step S202 is added to the standard threshold value MTHASTN for the throttle assist trigger obtained in step S203, to obtain an upper throttle assist trigger threshold MTHASTH. A difference DMTHAST for setting the hysteresis is extracted from the upper throttle assist trigger threshold value MTHASTH to obtain a lower throttle assist trigger threshold value MTHASTL. These upper and lower throttle assist trigger threshold values are shown with the dashed lines in FIG. 6, overlapping the standard threshold value MTHASTN of the throttle assist trigger table.

In step S205, it is determined whether the present value THEM indicating the opening state of the throttle is equal to or above the throttle assist trigger threshold value MTHAST calculated in step S204. The throttle assist trigger threshold value MTHAST, which includes the hysteresis mentioned above, refers to the upper throttle assist trigger threshold value MTHASTH when the opening of the throttle is increased, and refers to the lower throttle assist trigger threshold value MTHASTL when the opening of the throttle is decreased, When in step S205 the determination is "YES", that is, when the present value THEM of the opening of the throttle is equal to or above the throttle assist trigger threshold value MTHAST (which has the upper and lower hysteresis), the flow proceeds to step S206. When in step S205 the determination is "NO", that is, when the present value THEM of the opening of the throttle is not equal to or above the throttle assist trigger threshold value MTHAST (which has the upper and lower hysteresis), the flow proceeds to step S207.

In step S206, the throttle motor assist determination flag F_MASTTH is set to 1. In step S207, the throttle motor assist determination flag F_MASTTH is set to 0.

In the above process, it is determined whether the motor assist is required according to the throttle opening state TH. When in step S205 the present value THEM of the opening of the throttle is equal to or above the throttle assist trigger threshold value MTHAST, the throttle motor assist determination flag F_MASTTH is set to 1. In the following acceleration mode, the flag is read and it is determined that the motor assist is required.

When in step S207 the throttle motor assist determination flag F_MASTTH is set to 0, this indicates that the vehicle is outside the zone in which the motor assist determination is made based on the throttle opening state. The present invention performs the assist trigger determination based on the throttle opening state TH or on the air intake passage pressure PB of the engine E. When the present value THEM of the opening of the throttle is equal to or above the throttle assist trigger threshold value MTHAST, the assist determination is made based on the opening state TH of the throttle, while, when the present value THEM does not exceed the threshold value MTHAST, the determination is made based on the air intake passage pressure PB.

In the assist determination based on the air intake passage pressure PB, it is determined in step S208 whether the SOC is within zone B, depending on whether the energy storage zone B determination flag F_ESZONEB is set to 1 or not. The energy storage zone B determination flag F_ESZONEB is set to 1 when the SOC is within zone B, and is set to 0 when the SOC is outside zone B. When the SOC is within zone B, the flow proceeds to step S215 so as not to perform the motor assist based on the air intake passage pressure PB. When the SOC is outside zone B, the flow proceeds to step S209.

In step S209, it is determined whether the depth-of-discharge DOD of the battery is limited, depending on whether the DOD limit determination flag F_DODLMT is set to 1 or not. The DOD limit determination flag F_DODLMT is set to 1 when the depth-of-discharge limit control mode is selected through the "depth-of-discharge limit determination" described above, and is set to 0 in other cases. When the depth-of-discharge limit control mode is selected, the flow proceeds to step S215 so as not to perform the motor assist based on the air intake passage pressure PB. When the control mode is not selected, the flow proceeds to step S210. In step S210, a correction value DPBAST for correcting the assist trigger based on the air intake passage pressure is calculated. This calculation will be described later.

Subsequently, in step S211, a threshold value MASTL/H for the air intake passage pressure assist trigger is looked up in an air intake passage pressure assist trigger table. The air intake passage pressure assist trigger table, as shown with the two solid lines in FIG. 7, defines an upper air intake passage pressure assist trigger threshold value MASTH and a lower air intake passage pressure assist trigger threshold value MASTL for determining whether the motor assist is required depending on the engine rotational speed NE. In the process in step S211, when the air intake passage pressure PB, as it is increased or as the engine rotational speed NE is decreased, crosses the upper threshold value line MASTH from the lower area to the upper area in FIG. 7, the motor assist determination flag F_MAST is switched from 0 to 1. When the air intake passage pressure PB, as it is decreased or as the engine rotational speed NE is increased, crosses the lower threshold value line MASTL from the upper area to the lower area, the motor assist determination flag F_MAST is switched from 1 to 0.

In step S212, it is determined whether the motor assist determination flag F_MAST is 1. When the flag is 1, the flow proceeds to step S213. When the flag is not 1, the flow proceeds to step S214.

In step S213, it is determined whether the present value PBA of the air intake passage pressure is below the value obtained by adding the lower threshold value MASTL for the air intake passage pressure assist trigger, which was found in step S211, to the correction value DPBAST calculated in step S210. When the determination is "YES", the flow proceeds to step S215. When it is "NO", the flow returns.

In step S214, it is determined whether the present value PBA of the air intake passage pressure is above the value obtained by adding the upper threshold value MASTH for the air intake passage pressure assist trigger, which was found in step S211, to the value for correction DPBAST calculated in step S210. When the determination is "YES", the flow proceeds to step S216. When the determination is "NO", the flow returns.

In step S215, the motor assist determination flag F_MAST is set to 0. In step S216, the motor assist determination flag F_MAST is set to 1.

When in step S205 the present value THEM of the opening of the throttle is equal to or above the throttle assist trigger threshold value MTHAST defined in steps 202 to 204, motor assist is permitted. In contrast, when the opening of the throttle is below the threshold value, except when the SOC is within zone B and when the depth-of-discharge limit control mode is selected, motor assist is permitted based on the comparison of the present value PBA of the air intake passage pressure with the corrected values calculated in steps S210 to S214. The assist amount will be described later in the acceleration mode.

Figure 8:
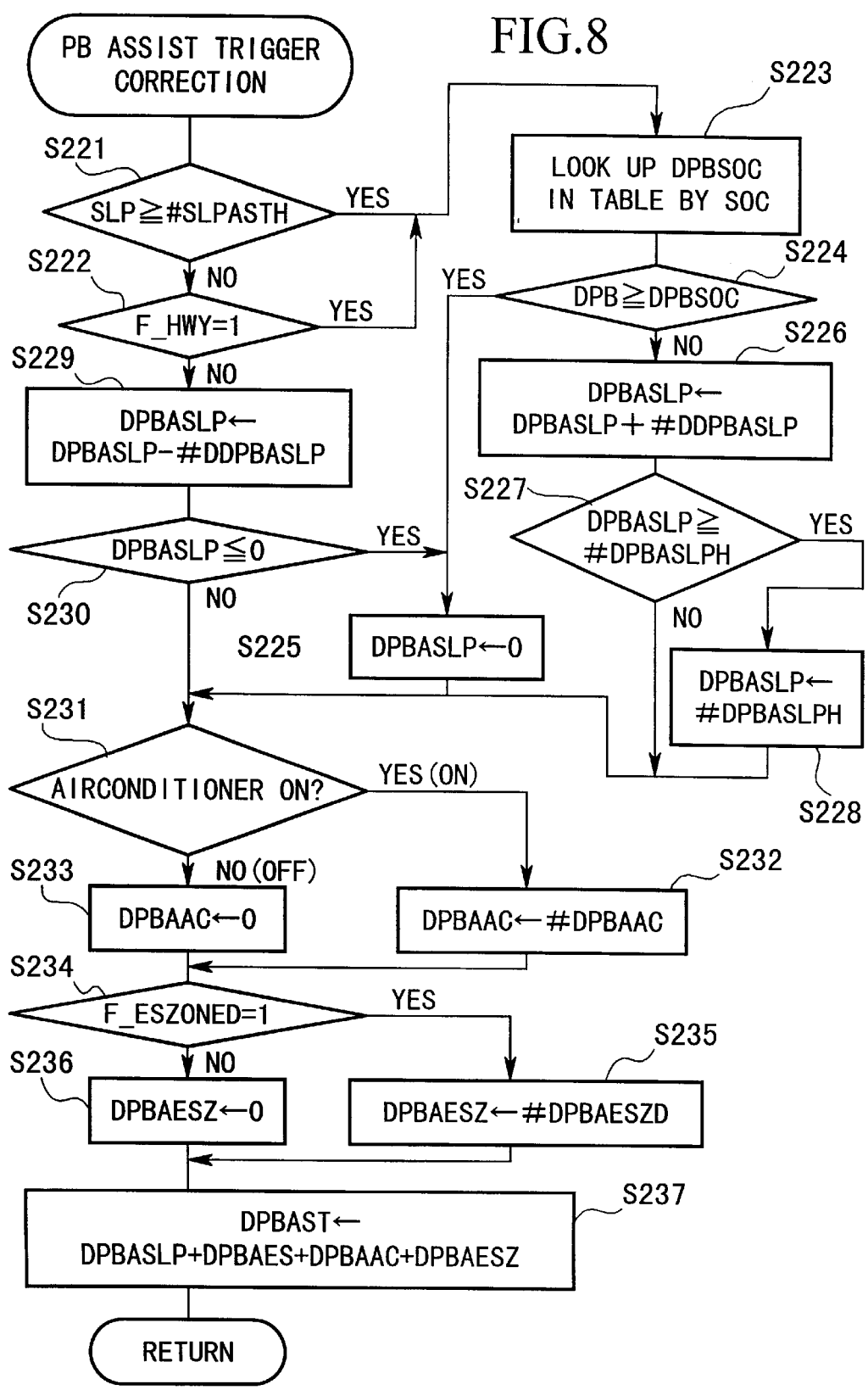
FIG. 8 is a flowchart showing the correction of the PB assist trigger of the present invention.

Process for Calculating Air Intake Passage Pressure Assist Trigger Correction Process The process for calculating the air intake passage pressure assist trigger correction in step S210 will be explained with reference to the flowchart of FIG. 8.

This process appropriately sets the assist trigger correction value DPBAST based on the air intake passage pressure, depending on the running conditions of the vehicle and the conditions of battery use. To determine the running conditions, it is checked, for example, whether the vehicle is going up a slope, whether the vehicle is running at a high speed, and whether an air conditioning device is turned on.

In step S221, it is determined whether the vehicle is going up a slope. The determination is made based on whether the road slope SLP is above a slope assist threshold value #SLPASTH. The road slope SLP is calculated, for example, by the slope calculation process disclosed in Japanese Patent Application, First Publication No. Hei 10-67167. The process calculates the slope based on a slope resistance obtained by extracting the running resistance and acceleration resistance from the drive wheel torque. This slope assist threshold value #SLPASTH is a lower limit slope angle which is the standard for determining whether the slope is steep or gentle and which is, i.e., 1%. The character "#" indicates that the value may be negative (the same shall apply hereinafter).

In step S222, it is determined whether the vehicle is cruising at a high speed, depending on whether a high speed determination flag F_HWY is set to 1 or not. To determine high speed cruising, an average vehicle speed based on the vehicle speed, which continuously varies, is calculated. Then, it is determined whether the deviation of the present vehicle speed with respect to the average vehicle speed is below a predetermined value. When the vehicle is cruising at a high speed, the high speed determination flag F_HVY is set to 1. In other cases, the high speed determination flag is set to 0. The predetermined value is chosen to be small (for example, 5 km/h) to ensure appropriate determination of whether the vehicle is running at a constant speed. When the deviation is below the predetermined value, it is determined that the vehicle is cruising at a high speed. The high speed cruising does not simply mean that the vehicle speed is high, but means that the vehicle is running at a constant speed.

When the vehicle is running at the high speed or is going up a slope, an air intake passage pressure variation determination table is referred to, based on the SOC in step S223.

This determination table defines a threshold value DPBSOC for the air intake passage pressure variation, for determining how much the air intake passage pressure varies to allow the vehicle to enter the assist zone, depending on the battery remaining value SOC. As shown with the solid line in FIG. 9, when the SOC is low, a large amount of variation is required to enter the assist zone. As the SOC increases, the vehicle enters the assist zone even when the variation is small.

In step S224, based on the result of the process in step S223, it is determined whether the present air intake passage pressure variation DPB is above the threshold value DPBSOC. When the present value is above the threshold value, a correction value DPBASLP based on slope or high-speed is set to 0 in step S225. When the present air intake passage pressure variation value DPB is not above the threshold value DPBSOC, a predetermined value #DDPBASLP is added to the slope/high-speed correction value DPBASLP to obtain a new value DPBASLP in step S226.

In step S227, it is determined whether the slope/high-speed correction value DPBASLP is above an upper limit value #DPBASLPH. When the DPBASLP is above the #DPBASLPH, the DPBASLP is set to the upper limit value #DPBASLPH in step S228.

When in step S222 the high speed determination flag F_HWY is not set to 1, that is, when the vehicle is not running at the constant speed, the predetermined value #DDPBASLP is extracted from the slope/high-speed correction value DPBASLP to obtain a new DPBASLP in step S229.

In step S230, it is determined whether the slope/high-speed correction value DPBASLP, obtained in step S229, is equal to or below 0. When DPBASLP is equal to or below 0, the flow proceeds to step S225, and the slope/high-speed correction value DPBASLP is set to 0. In other cases, the flow proceeds to step S231.

In step S231, it is determined whether the air conditioner of the vehicle is turned on. When it is turned on, a predetermined value #DPBAAC is input as the air conditioner correction value DPBAAC (step S232). When the air conditioner is not turned on, the air conditioner correction value DPBAAC is set to 0 (step S233). Because the load to the engine is increased when the air conditioner is turned on, the predetermined value #DPBACC increases the value to determine whether the motor assist is started.

In step S234, it is determined whether the SOC is within zone D, depending on whether the energy storage zone D determination flag F_ESZONED is set to 1 or not. When the SOC is within zone D, a predetermined value #DPBAESZD is input as a zone D correction value DPBAESZ (step S235). When the SOC is outside zone D, the correction value DPBAESZ for zone D is set to 0 (step S236). Because the battery is overcharged when the SOC is within zone D, the predetermined value #DPBAESZD is negative, to decrease the value to determine whether the motor assist is started, to increase the frequency of motor assists.

Subsequently, in step S237, the slope/high-speed correction value DPBASLP obtained in steps S225, S226, S228, and S229, and the air conditioner correction value DPBACC obtained in steps S232 and S233, and correction value DPBAESZ for zone D obtained in steps S235 and S236 are added up to obtain the assist trigger correction value DPBAST based on the air intake passage pressure, and the flow returns.

Process for Calculating Throttle Assist Trigger Correction Value

Figure 10:
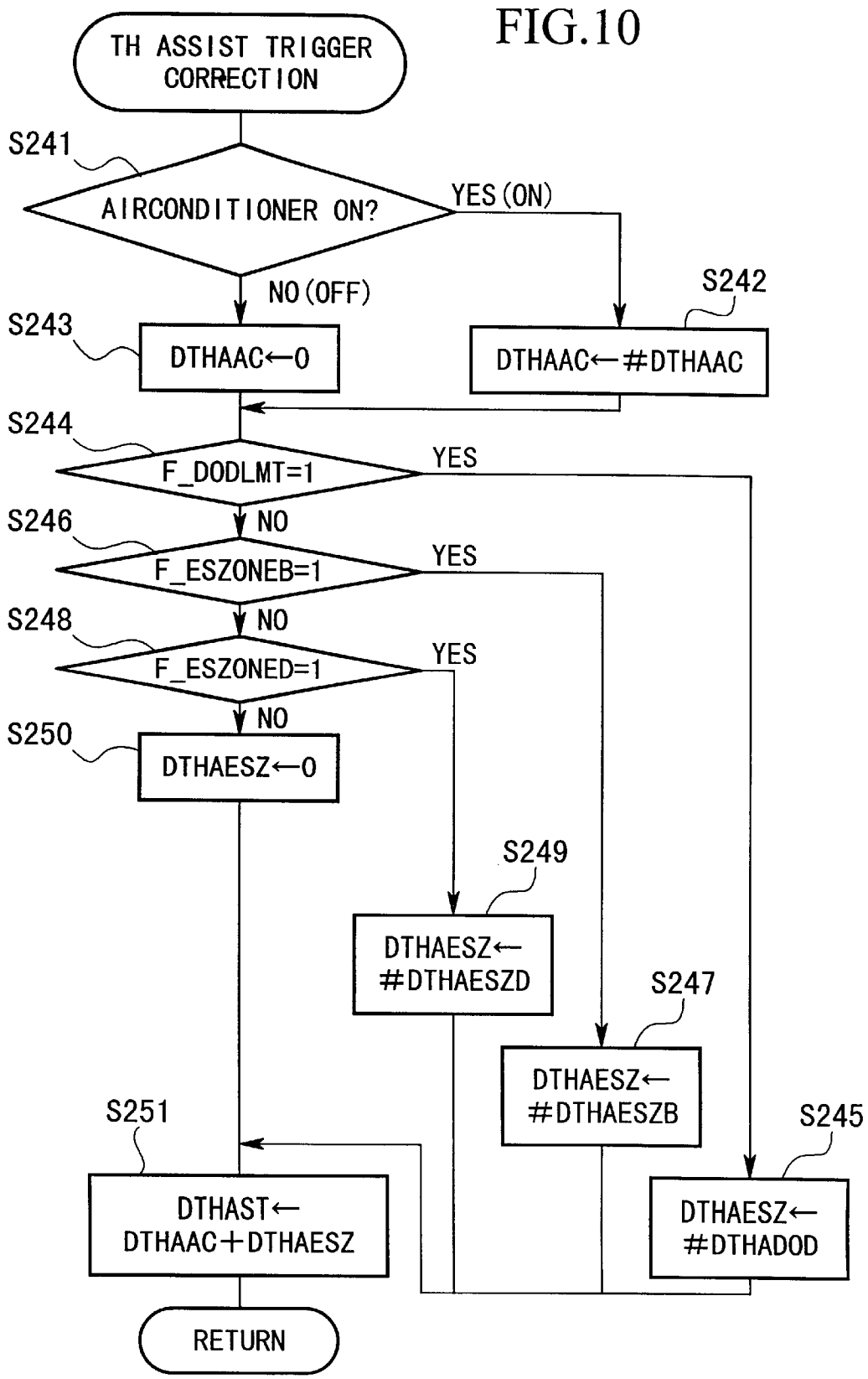
FIG. 10 is a flowchart showing the correction of the TH assist trigger of the present invention.

Next, the throttle assist trigger correction value calculation process in step S202 will be explained with reference to the flowchart of FIG. 10.

In step S241, it is determined whether the air conditioner is turned on. When it is turned on, an air conditioner correction value DTHAAC is set to a predetermined value #DTHAAC (step S242). When the air conditioner is not turned on, the air conditioner correction value DTHAAC is set to 0 (step S243). In a manner similar to the process for calculating the assist trigger correction value based on the air intake passage pressure, the predetermined value #DTHAAC increases the value to determine whether the motor assist is started when the air conditioner is turned on.

In step S244, it is determined whether the depth-of-discharge DOD of the battery is limited, depending on whether the DOD limit determination flag F_DODLMT is set to 1 or not. In the depth-of-discharge limit control mode, a standard threshold value DTHAESZ for the throttle assist trigger is set to a predetermined value #DTHADOD in step S245. When the depth-of-discharge limit control mode is stopped, the flow proceeds to step S246. The predetermined value #DTHADOD is positive to increase the value to determine whether the motor assist is started, reducing the frequency of motor assists when the depth-of-discharge limit control mode is selected.

In step S246, it is determined whether the SOC is within zone B, depending on whether the energy storage zone B determination flag F_ESZONE B is set to 1 or not. When the SOC is within zone B, the standard threshold value DTHAESZ for the throttle assist trigger is set to a predetermined value #DTHAESZB in step S247. When the SOC is outside zone B, the flow proceeds to step S248. The predetermined value #DTHAESZB is positive to increase the value to determine whether the motor assist is started, reducing the frequency of motor assists when the SOC is within zone B.

In step S248, it is determined whether the SOC is within zone D, depending on whether the energy storage zone D determination flag F_ESZONED is set to 1 or not. When the SOC is within zone D, the standard threshold value DTHAESZ for the throttle assist trigger is set to the predetermined value #DTHAESZD in step S249. When the SOC is outside zone D, the flow proceeds to step S250. The predetermined value #DTHAESZD is negative to decrease the value to determine whether the motor assist is started, increasing the frequency of motor assists when the battery is overcharged in zone D.

When the depth-of-discharge limit control mode is selected and the SOC is outside zones B and D, the standard threshold value DTHAESZ for the throttle assist trigger is set to 0 in step S250.

Subsequently, in step S251, the air conditioner correction value DTHAAC obtained in steps S242 and S243, and the standard threshold value DTHAESZ for the throttle assist trigger obtained in one of steps S245, S247, S249, and S250 are added up to obtain the correction value DTHAST for correcting the assist trigger based on the state of the throttle, and the flow returns.

Accordingly, in the depth-of-discharge limit control mode, the motor assist to decrease the load is not performed in the assist trigger determination based on the air intake passage pressure (step S209). In the assist trigger determination based on the state of throttle, the value for the assist trigger is increased (step S245), thereby reducing the frequency of motor assists.

Acceleration Mode

Figure 11:
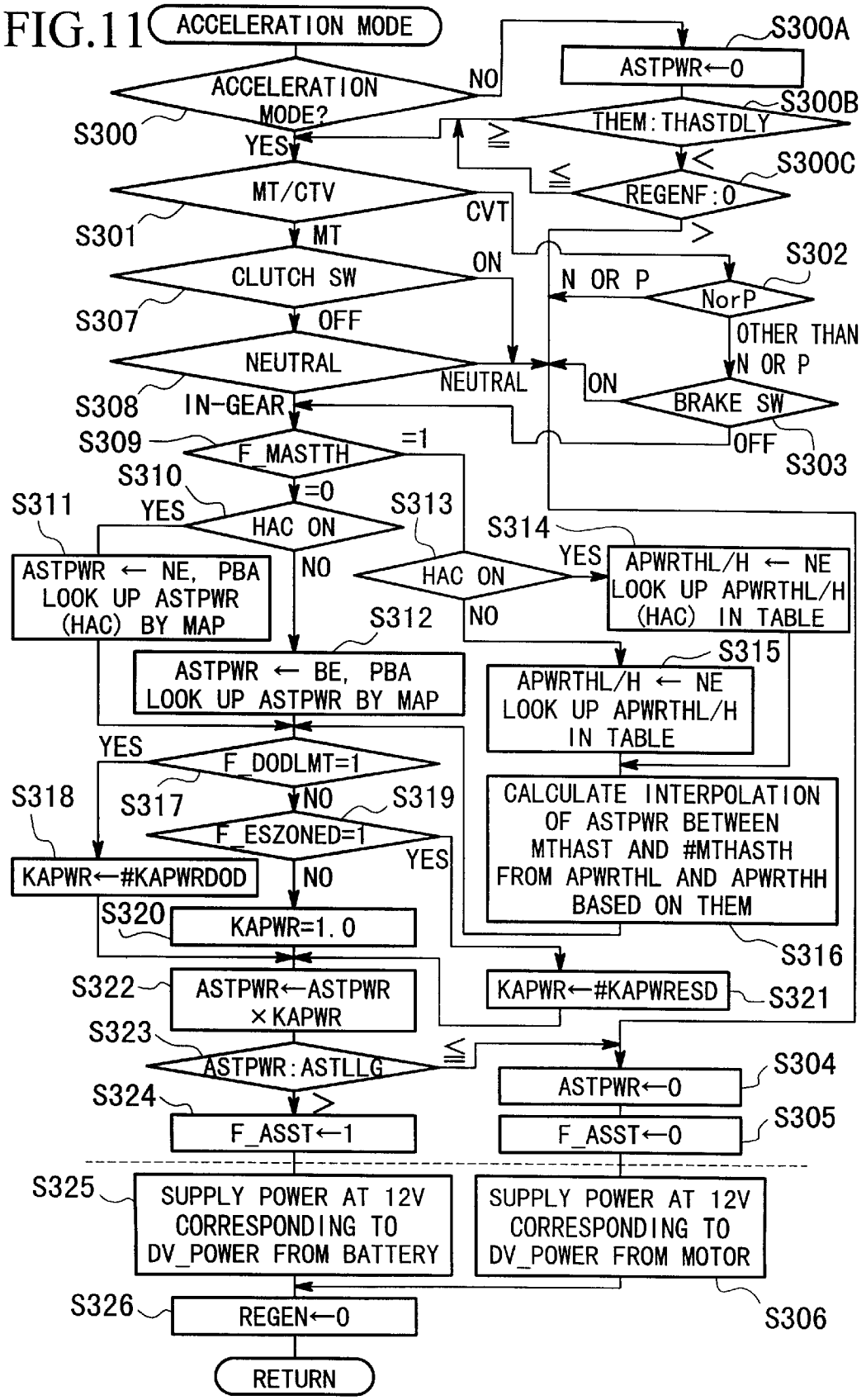
FIG. 11 is a flowchart showing an acceleration mode of the present invention.

Next, the acceleration mode will be explained with reference to the flowchart of FIG. 11.

Initially, in step S300, it is determined whether the acceleration mode is selected. When the acceleration mode is not selected, the assist amount ASTPW is set to 0 in step S300A. When in step S300 the acceleration mode is selected, the flow proceeds to step S301.

In step S300B, the present value THEM of the throttle opening state TH is compared with a throttle state THAST-DLY for determining whether to start the assist. When in step S300B the THEM<the THASTDLY, a decrement REGENF in generated electric energy is compared with 0 in step S300C. When in step S300C REGENF≦0, the flow proceeds to step S301. When in step S300C REGENF>0, the flow proceeds to step S304. When in step S300B the THEM≧the THASTDLY, the flow proceeds to step S301.

In step S301, it is determined which transmission the vehicle has, an MT or a CVT. When the vehicle has the CVT, the shift position is detected in step S302. When in step S302 the transmission is in the neutral position (N) or the parking position (P), the assist amount ASTPWR is set to 0 so as not to perform the motor assist in step S304, and the assist determination flag F_ASST is set to 0 in step S305.

In step S306, an amount of electric energy corresponding to the consumed electric power, at 12 volts, is supplied to the auxiliary battery 4 by the regeneration by the motor M. In steps S306 and S325, reference character DV denotes the downverter 5.

When in step S302 the transmission is at a position other than the N-position and the P-position, the ON-OFF state of the brake switch $S_4$ is detected in step S303. When in step S303 the brake switch $S_4$ is turned on, the flow proceeds to step S304. When in step S303 the brake switch $S_4$ is turned off, the flow proceeds to step S309 described later.

When in step S301 the vehicle has an MT, the ON-OFF state of the clutch switch $S_5$ is detected in step S307. When in step S307 the clutch switch $S_5$ is turned off, it is determined in step S308 whether the transmission is in the neutral position. In an "in-gear" state, the flow proceeds to step S309. Then, which mode is selected, i.e., a TH (throttle) assist mode corresponding to the engine full loading zone, or a PB (air intake passage pressure) assist mode corresponding to the engine partial loading zone, is detected, based on the throttle motor assist determination flag F_MASTTH. The TH assist mode or the PB assist mode is determined based on F_MASTTH because the assist trigger involves two assist modes.

When the throttle motor assist determination flag F MASTTH is 1, the vehicle is in the TH assist mode. When F_MASTTH is 0, the vehicle is in the PB assist mode. When in step S307 the clutch switch $S_5$ is turned on, or when in step S308 the transmission is in the neutral position, the flow proceeds to step S304.

When in step S309 the throttle motor assist determination flag F_MASTTH is 0, that is, when the PB assist mode is selected, it is determined in step S310 whether the air conditioner HAC is turned on.

When in step S310 the determination is "NO", that is, when the air conditioner HAC is turned off, the assist amount ASTPWR is looked up based on the map (not shown) of the engine rotational speed NE and the air intake passage pressure PB in step S312. By this map lookup, the assist amount ASTPWR corresponding to the air intake passage pressure PB defined by engine rotational speed NE is read in units kW. The map is changed depending on the MT or CVT, the gears in the MT, and the stoichiometric or the lean-burn state. When the map lookup is performed in step S312, the flow proceeds to step S317.

When in step S310 the determination is "YES", that is, when the air conditioner HAC is turned on, the map lookup for the assist amount ASTPWR(HAC), which is obtained by adding the load from the air conditioner to the map used in step S312, is performed based on the engine rotational speed NE in step S311. When the air conditioner HAC is turned on, the map is changed depending on the gear positions of the MT vehicle and on the stoichiometric or the lean-burn state. After the map lookup for the assist amount ASTPWR (HAC), which includes the additional amount, is performed, the flow proceeds to step S317.

When in step S309 the throttle motor assist determination flag F_MASTTH is 1, that is, when the vehicle is in the TH assist mode, it is determined in step S313 whether the air conditioner HAC is turned on. When in step S313 the determination is "NO", that is, when the air conditioner HAC is turned off, the table lookup for the throttle assist amount APWRTHL/H, as shown in FIG. 12, is performed based on the engine rotational speed NE in step S315.

When in step S313 the determination is "YES", that is, when the air conditioner HAC is turned on, the table lookup (not shown) for the throttle assist amount APWRTHL/H (HAC), which includes the load from the air conditioner, is performed based on the engine rotational speed NE, in a manner similar to the PB assist mode, in step S314. When the air conditioner HAC is turned on, the map is changed depending on the gear position of the MT vehicle and on the stoichiometric or the lean-burn state. Thus, the table lookup for the throttle assist amount APWRTHL/H(HAC), which includes the additional amount when the air conditioner HAC is turned on, is performed, and the flow proceeds to step S316.

Figure 12:
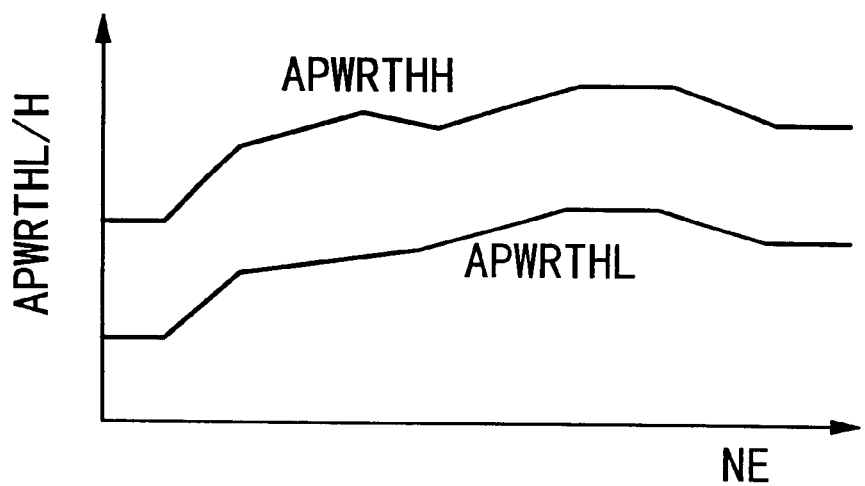
FIG. 12 is a graph showing threshold values of the assist amount of the present invention.

As shown in FIG. 12, the table in step S315 defines the upper throttle assist amount threshold value APWRTHH and the lower throttle assist amount threshold value APWRTHL depending on the engine rotational speed NE. Between the threshold values, there is a predetermined difference (for example, the gap of 4 kW) corresponding to the engine rotational speed NE.

Figure 13:
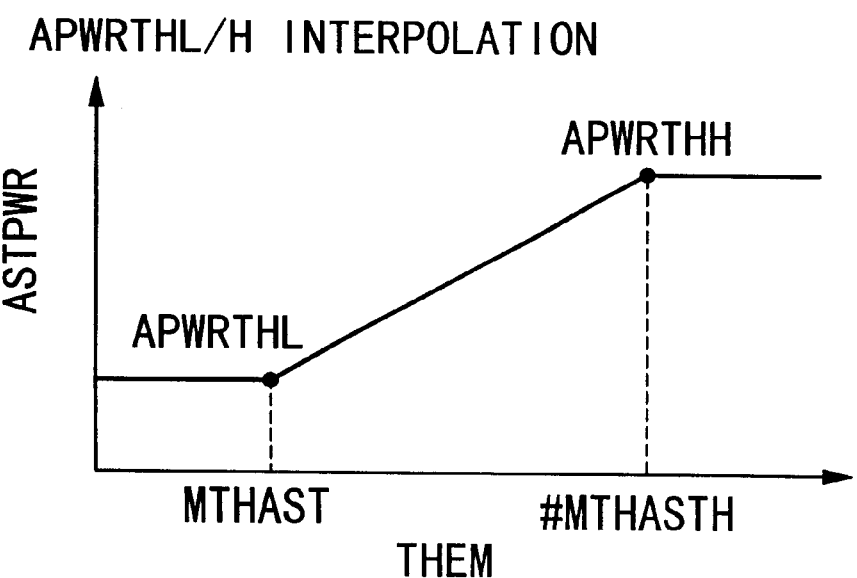
FIG. 13 is a graph showing interpolation for the assist amount of the present invention.

Subsequently, in step S316, as shown in FIG. 13, as the throttle opening state varies from the throttle assist trigger threshold value MTHAST to an opening state #MTHASTH of the throttle TH by a predetermined opening amount (for example, an opening degree based on a function of the engine rotational speed NE), the assist amount is interpolated between the upper throttle assist amount threshold value APWRTHH found in steps S314 and S315 and the lower throttle assist amount threshold value APWRTHL.

That is, in steps S314 and S315, the upper throttle assist amount threshold value APWRTHH and the lower throttle assist amount threshold value APWRTHL are set based on the engine rotational speed NE. Then, between the throttle TH opening state MTHAST, which is obtained in the assist trigger determination, and the throttle TH opening state #MTHASTH, it is looked up how the amount in kW is distributed.

When the driver operates the pedal and the vehicle is switched from the PB assist mode to the TH assist mode, the above process prevents a shock due to an abrupt variation in assist amount ASTPWR.

When the vehicle is switched from the PB assist mode to the TH assist mode, the assist amount is gradually changed depending on the opening state of the throttle so that the engine smoothly shifts from the partial loading zone to the full loading zone, In step S317, it is determined whether the vehicle is in the depth-of-discharge limit control mode. When in step S317 the DOD limit determination flag F_DODLMT is 0, that is, when the depth-of-discharge limit control mode is not selected, it is determined in step S319 whether the SOC is within zone D, based on the energy storage determination flag F_ESZONED. When in step S319 the energy storage determination flag F_ESZONED is 0, that is, when the SOC is outside zone D, the correction coefficient for the assist amount KAPWR is set to 1.0 in step S320.

When in step S317 the DOD limit determination flag F_DODLMT is 1, that is, when the depth-of-discharge limit control mode is selected, the correction coefficient for the assist amount KAPWR is set to a coefficient #KAPVRDOD (equal to or below 1) for the depth-of-discharge limit control mode in step S318.

When in the acceleration mode the vehicle enters the depth-of-discharge limit control mode, the assist amount is decreased because the correction coefficient for the assist amount is set to a coefficient #KAPWRDOD (equal to or below 1) in step S318. As the result, the reduction in the SOC of the battery 3 is prevented while increasing the SOC quickly. When the #KAPWRDOD for the depth-of-discharge limit control mode is the maximum value 1, the assist amount is the same in step S320, that is, the normal assist amount is maintained, so that the vehicle can respond to the intention of the driver to accelerate the vehicle.

When in step S319 the energy storage determination flag F_ESZONED is 1, that is, when the SOC is within zone D, the correction coefficient for the assist amount KAPWR is set to a coefficient #KAPWRESD (equal to or above 1) for zone D in step S321.

In step S322, the assist amount ASTPWR is multiplied by the correction coefficient KAPWR, and thus the necessary assist amount is obtained. Therefore, the SOC is decreased by increasing the assist amount, so that the over-charge state can be avoided. The assist amount is increased in both the air intake passage pressure assist mode and the throttle assist mode. Therefore, in both modes, the acceleration becomes satisfactory by the increased assist amount.

The final assist amount ASTPWR obtained in step S322 is compared with the assist requirement determination value (the value to determine whether the assist is required or not) ASTLLG in step S323. When the assist amount ASTPWR≦the assist requirement determination value ASTLLG, the flow proceeds to step S304. When in step S323 the assist amount ASTPWR>the assist requirement determination value ASTLLG, the assist determination flag F_ASST is set to 1 in step S324.

When the motor M is generating a driving force, regeneration cannot be carried out. Therefore, an amount of electric energy corresponding to the consumed electric power, at 12 volts, is supplied from the battery 3 to the auxiliary battery 4 in step S325. In step S326, the non-braking regeneration amount REGEN is set to 0, and the flow returns.

Cruise Mode

Figure 14:
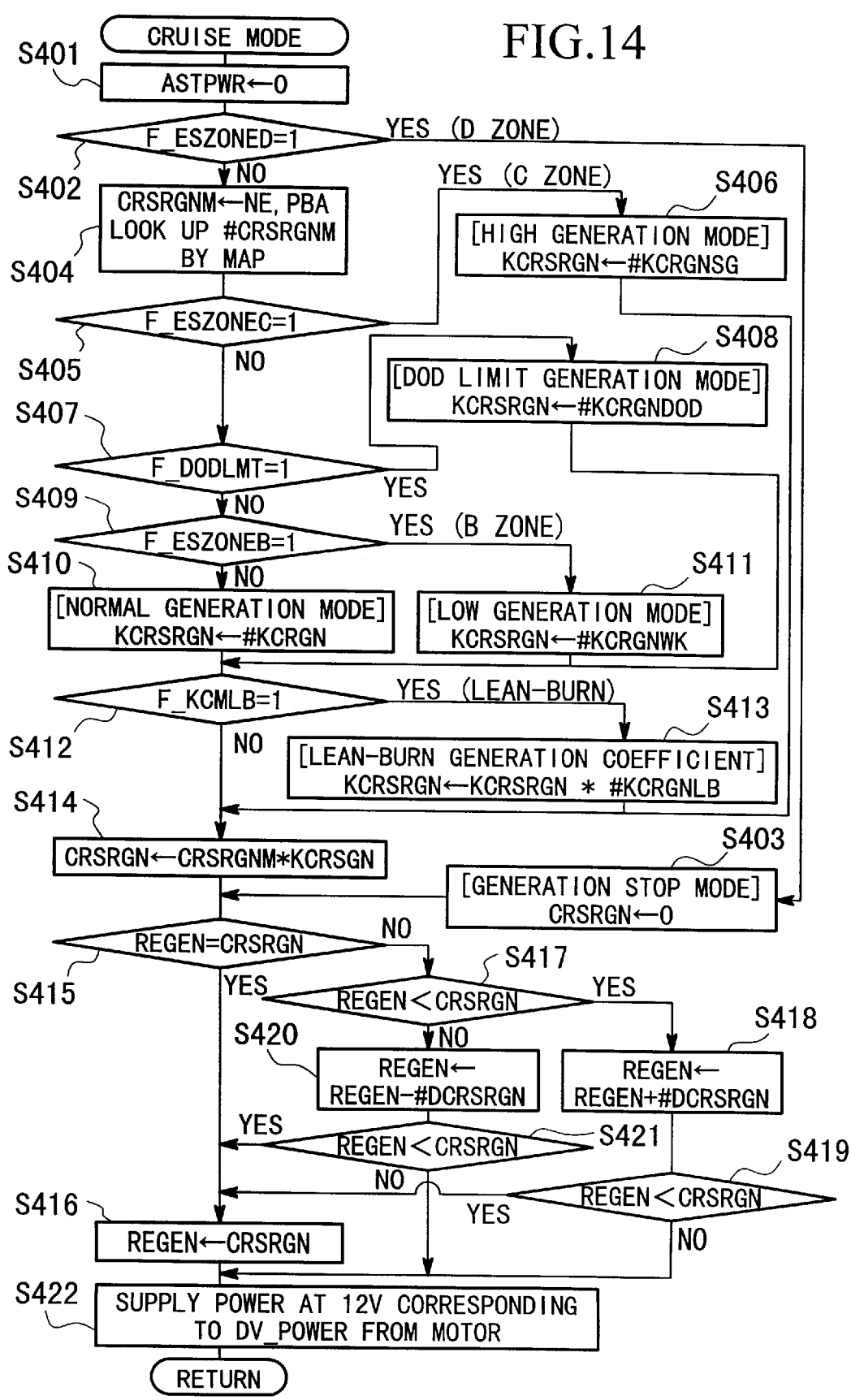
FIG. 14 is a flowchart showing a cruise mode of the present invention.

Next, the cruise mode will be explained with reference to the flowchart of FIG. 14.

When in step S401 the assist amount ASTPWR is set to 0, it is determined in step S402 whether the SOC is within zone D, based on the energy storage zone D determination flag F_ESZONED.

When in step S402 the energy storage zone D determination flag F_ESZONED is 1, that is, when the SOC is within zone D, a cruise generation CRSRGN is set to 0 in step S403 to enter a generation stop mode. In this generation stop mode, the charge to the battery 3 is stopped while only the 12 volt auxiliary battery 4 is charged in step S422. In this generation stop mode, the increase of the SOC of the battery 3 is prevented when the vehicle is cruising, thereby urging the vehicle to leave the over-discharge state corresponding to zone D.

When in step S402 the energy storage zone D determination flag F_ESZONED is 0, that is, the SOC is outside zone D, a map value CRSRGNM for the cruise charge is looked up and is read in the map of cruise charge #CRSRGNM in step S404.

The map value CRSRGNM for the cruise charge depends on the engine rotational speed NE and the air intake passage pressure PB. The map is changed depending on the MT or CVT. Because the cruise charge causes a load on the engine E, the map value is defined depending on the engine rotational speed NE and the air intake passage pressure PB which correspond to the load.

In step S405, it is determined whether the SOC is within zone C. When the energy storage zone C determination flag F_ESZONEC is 1, that is, when the SOC is within zone C, a high generation mode is initiated in step S406, and a correction coefficient KCRSRGN for the cruise generation is set to #KCRGNSG. In the high generation mode, when the vehicle is cruising, the SOC is quickly increased, thereby urging the vehicle to leave the overdischarge state corresponding to zone C.

When the high generation mode is selected in zone C, the FIECU 11 prohibits the entry into the lean-burn mode. The reason why the lean-burn mode is prohibited in zone C is that, although in zone C the output must be sufficient to perform generation in the high generation mode, the output may be insufficient in the lean-burn mode.

When in step S405 the energy storage zone C determination flag F_ESZONEC is 0, that is, when the SOC is outside zone C, the flow proceeds to step S407, and it is determined whether the vehicle is in the depth-of-discharge limit control mode.

When in step S407 the DOD limit determination flag F_DODLMT is set to 1 and the vehicle is in the depth-of-discharge limit control mode, a DOD limit generation mode is initiated in step S408, and the correction coefficient KCRSRGN for the cruise generation is set to #KCRGN-DOD. In the DOD limit generation mode, the SOC can be quickly increased when the vehicle enters the depth-of-discharge limit control mode while the vehicle is cruising.

When in step S407 the DOD limit determination flag F_DODLMT is set to 0 and the depth-of-discharge limit control mode is stopped, the flow proceeds to step S409, and it is determined whether the SOC is within zone B.

When in step S409 the energy storage zone B determination flag F_ESZONEB is 1, that is, when the SOC is within zone B, a low generation mode is selected in step S411, and the correction coefficient KCRSRGN for the cruise generation is set to #KCRGNWK. In the low generation mode, the SOC is gradually increased when the vehicle is cruising, thereby urging the vehicle to leave zone B and to enter zone A.

When in step S409 the energy storage zone B determination flag F_ESZONEB is 0, that is, when the SOC is outside zone B, the flow proceeds to step S410, the normal generation mode for zone A is initiated, and the correction coefficient KCRSRGN for the cruise generation is set to #KCRGN.

Because of differences between coefficients in the normal generation mode in step S410, the low generation mode in step S411, the DOD limit generation mode in step S408, and the high generation mode in step S406, the electric power generation in zones according to the SOC and in the depth-of-discharge limit control mode have the relationship below: the electric power generation in zone C>the electric power generated in zone B≧the electric power generated in the depth-of-discharge limit control mode>the electric power generated in zone A.

Because in zone D the generation is not performed, no coefficient is set in zone D.

According to the generation modes, the relationship is: the electric power generated in the high generation mode>the electric power generated in the low generation mode≧the electric power generated in the DOD limit generation mode>the electric power generated in the normal generation mode>the electric power generated in the generation stop mode=0.

When in the normal mode in step S410, in the low generation mode in step S411, and in the DOD limit generation mode in step S408 the coefficients are set, it is determined in step S412 whether the vehicle is in the lean-burn mode, based on a lean-burn determination flag F_KCMLB. The flow bypasses step S412 when the high generation mode is selected in step S406, because the lean-burn mode is prohibited in zone C and the calculation of the correction coefficient is not required.

When in step S412 the lean-burn determination flag F_KCMLB is 1, that is, the vehicle is in the lean-burn mode, a correction coefficient #KCRGNLB for the lean-burn mode is added to the above correction efficient so as to obtain a lean-burn generation coefficient KCRSRGN in step S413. Because in the lean-burn mode the engine E is driven at an air-fuel ratio greater than the theoretical air-fuel ratio, the engine may leave the lean-burn zone when a large amount of torque is generated. Therefore, to prevent the exit from the lean-burn zone and the entry into the stoichiometric zone, the correction coefficient (equal to or below 1) decreases the generation. Thus, the frequency of switching between the lean-burn zone and the stoichiometric zone is reduced, thereby providing improved riding comfort.

In step S414, the map value CRSRGNM for the cruise generation is multiplied by the above correction coefficient to obtain a cruise generation CRSRGN.

In step S415, it is determined whether a non-braking regeneration REGEN of the motor M is equal to the cruise generation CRSRGN. Even when in step S403 the generation stop mode is selected, the determination in step S415 is made. When in step S415 they are equal, the cruise generation CRSRGN is assigned as the non-braking regeneration REGEN provided by the motor in step S416.

When in step S417 REGEN<CRSRGN, that is, when the nonbraking regeneration REGEN is below the cruise generation CRSRGN, the delta value #DCRSRGN of the cruise generation is gradually added to the non-braking regeneration REGEN in step S418. When in step S419 REGEN>CRSRGN, that is, when the non-braking regeneration REGEN is above the cruise generation CRSRGN, the flow proceeds to step S416.

When in step S419 REGEN≦CRSRGN, that is, when the nonbraking regeneration REGEN is equal to or below the cruise generation CRSRGN, the flow proceeds to step S422.

When in step S417 REGEN≧CRSRGN, that is, when the nonbraking regeneration REGEN is equal to or above the cruise generation CRSRGN, the delta value #DCRSRGN of the cruise generation is gradually decreased from the non-braking regeneration REGEN in step S420. Then, in step S421, it is determined whether the non-braking regeneration REGEN is below the cruise generation CRSRGN. When in step S421 REGEN<CRSRGN, that is, the non-braking regeneration REGEN is below the cruise generation CRSRGN, the flow proceeds to step S416.

When in step S421 REGEN≧CRSRGN, that is, when the nonbraking regeneration REGEN is equal to or above the cruise generation CRSRGN, the flow proceeds to step S422.

By gradually increasing or decreasing the generation, shocks due to sudden variations in the generation can be prevented.

In step S422, an amount of electric energy corresponding to the consumed electric power, at 12 volts, is regenerated by the motor M and is supplied to the auxiliary battery 4.

Even when in the cruise mode the depth-of-discharge limit control mode is initiated, whatever zone the SOC is set to, i.e., zone A to D, and even when in the lean-burn mode, the electric power generation is appropriately performed in consideration of the SOC.

The present invention is not limited to the embodiments, and, other processes for setting the corrected values may be employed. For example, the corrected values may be given by a map, a correction value may be added or extracted, and a correction coefficient may be used. While in the above embodiments the automatic transmission is the CVT, an automatic multi-stage transmission may be used. While in the embodiments, the starter and the motor are used together to start the engine, one or both of them may be used.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A control system for a hybrid vehicle with an engine for producing a driving force for said vehicle, a motor for producing an assist driving force to assist the output from said engine, and a power storage unit for supplying electric energy to said motor and storing regenerated energy produced by regeneration of said motor when said vehicle decelerates, said control system comprising:

a charge zone determining device for determining whether a state of charge is within a normal use zone; a temporary use zone; an over-discharge zone, or an over-charge zone;

a generation mode selector for selecting one of a normal generation mode corresponding to said normal use zone, a low generation mode corresponding to said temporary use zone, a high generation mode corresponding to said over-discharge zone, and a generation stop mode corresponding to said over-charge zone, based on the determination by said charge zone determining device; and a generation amount setter for setting the amount of electric power generation corresponding to each mode.

2. A system according to claim 1, further comprising:

a DOD limit determining device for determining whether the vehicle is in a depth-of-discharge limit control mode, in which said power storage unit is charged to recover the initial state of charge, which was detected at the starting of said vehicle, when the remaining charge is decreased from the initial state of charge by a predetermined amount, wherein, when said DOD limit determining device determines that the vehicle is in the depth-of-discharge limit control mode, said generation mode selector selects a DOD limit generation mode, and said generation amount setter sets the amount of generation corresponding to the DOD limit generation mode.

3. A system according to claim 2, wherein the electric power generation set by said generation amount setter has the relationship of:

the electric power generated in the high generation mode>the electric power generated in the low generation mode≧the electric power generated in the DOD limit generation mode>the electric power generated in the normal generation mode>the electric power generated in the generation stop mode=0.

4. A system according to any one of claims 1 to 3, further comprising:

a lean-burn mode determining device for determining whether the vehicle is in the lean-burn mode in which the engine is driven at an air fuel ratio greater than the theoretical air-fuel ratio, wherein, when said lean-burn mode determining device determines that the vehicle in the lean-burn mode, the amount of electric power generation set by said generation amount setter is decreased.

5. A system according to claim 4, wherein, when said charge zone determining device determines that the power storage unit is in the over-discharge zone, the entry into the lean-burn mode is prohibited.

* * * * *